US006288898B1

(12) United States Patent
Johnson et al.

(10) Patent No.: US 6,288,898 B1
(45) Date of Patent: Sep. 11, 2001

(54) APPARATUS FOR MOUNTING AND COOLING A SYSTEM COMPONENTS IN A COMPUTER

(75) Inventors: Robert W. Johnson, Pflugerville; Richard L. Eddings, II, Austin; James D. Curlee, Round Rock, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/467,287

(22) Filed: Dec. 20, 1999

(51) Int. Cl.[7] ............................................. G06F 1/20
(52) U.S. Cl. ...................... 361/687; 361/695; 361/796; 361/802; 361/816; 165/104.33; 165/185; 312/223.1
(58) Field of Search .................................... 361/683, 685, 361/687, 692, 695–699, 678, 717–719, 700, 796, 756; 165/80.3, 104.31, 122, 40.121, 104.32, 104.33, 104.34, 104.26; 454/184; 62/259.2, 3.7, 263; 257/713–727; 364/708.1; 312/223.1; 211/41; 174/16.1, 16.3; 360/97.01, 97.02, 97.03, 98.01, 137; 369/75.1, 80

(56) References Cited

U.S. PATENT DOCUMENTS

| 4,186,422 | 1/1980 | Laermer . |
| 4,763,298 | 8/1988 | Hoelzel et al. . |
| 4,894,749 | 1/1990 | Elko et al. . |
| 5,136,465 | 8/1992 | Benck et al. . |
| 5,214,570 | 5/1993 | Shah et al. . |
| 5,338,214 | 8/1994 | Steffes et al. . |
| 5,511,024 | 4/1996 | Ware et al. . |
| 5,524,232 | 6/1996 | Hajeer . |
| 5,532,954 | 7/1996 | Bechtolsheim et al. . |
| 5,671,120 | 9/1997 | Kikinisi . |
| 5,796,580 | * 8/1998 | Komatsu et al. ..................... 361/687 |
| 5,852,547 | 12/1998 | Kitlas et al. . |
| 5,936,836 | * 8/1999 | Scholder ............................. 361/695 |
| 5,943,215 | 8/1999 | Carney et al. . |
| 6,094,346 | * 7/2000 | Schweers et al. ................... 361/695 |
| 6,128,187 | * 10/2000 | Mimlitch et al. ................... 361/690 |
| 6,130,819 | * 10/2000 | Lofland et al. ..................... 361/695 |
| 6,130,820 | * 10/2000 | Konstad et al. ..................... 361/695 |
| 6,185,065 | * 2/2001 | Hasegawa et al. ............... 360/97.02 |

* cited by examiner

*Primary Examiner*—Leo P. Picard
*Assistant Examiner*—Michael Datskovsky
(74) *Attorney, Agent, or Firm*—Haynes and Boone, L.L.P.

(57) ABSTRACT

An apparatus includes a base substrate and a plurality of spaced apart end brackets attached to the base substrate. A pivotable one of the end brackets is movable between a retracted position and an extended position with respect to the base. A plurality of spaced apart side panel assemblies are removably mounted between each end bracket when the pivotable one of the end brackets is in the extended position. A first edge of each side panel assembly is positioned adjacent to the base substrate. A shroud assembly extends between the two side panel assemblies adjacent to a second edge of each side panel assembly. The shroud assembly, the base substrate and the side panel assemblies define an air duct. A fan is mounted adjacent to at least one of the end brackets for directing air through the air duct. The part count of the apparatus is reduced such that cost and assembly time are also reduced. Furthermore, at least one of the end brackets can be pivoted to the retracted position to allow the printed circuit substrate and end brackets to be more easily installed in the chassis as an assembly and to permit cost effective servicing of the apparatus.

22 Claims, 10 Drawing Sheets

APPARATUS FOR MOUNTING AND COOLING A SYSTEM COMPONENTS IN A COMPUTER

BACKGROUND

The disclosures herein relate generally to computer systems and more particularly to an apparatus and method for mounting a cooling system components in a computer.

Computers include system components such as memory modules, microprocessors and video controllers that generate a considerable amount of heat. Advances in the performance of many system components demand more effective thermal solutions. Furthermore, these thermal solutions must be offered without sacrificing mechanical support, cost, serviceability, or acoustic performance.

To maintain heat generating components at a suitable temperature level, one or more cooling fan are traditionally mounted in a computer to provide airflow for effectively cooling the heat sensitive components. This requires fasteners or additional components, increasing cost, assembly time, and acoustic noise. In some applications, a separate shroud or duct is sometimes needed to ensure that airflow is properly directed with respect to the heat generating components. The fan or fans are usually mounted to an internal bracket or an external wall of the system chassis.

U.S. Pat. No. 5,852,547 discloses a shroud attachment for positioning a central processing unit (CPU) module relative to a cooling fan on a motherboard in a computer. The CPU module includes an enclosure housing for directing air past the CPU. The system components comprising the CPU are attached to the enclosure such that the system components and the enclosure housing must be removed from the motherboard as a unit.

U.S. Pat. No. 5,338,214 discloses an expansion card/riser card module which includes a housing within which a riser card and a plurality of associated expansion cards are removably supported and electrically coupled to each other. The housing includes a fan for directing a stream of air over the riser and expansion cards. The construction disclosed requires that the housing and the attached cards be attached to the motherboard as a unit.

U.S. Pat. No. 5,793,611 discloses an apparatus for cooling heat generating components in a computer system. The apparatus includes an enclosure having a plurality of walls defining a cavity. A printed circuit board is mounted within the cavity and heat generating components are mounted to the printed circuit board. A first fan is provided for inducing air to flow into the enclosure and a second fan is provided for expelling air from the enclosure. A baffle is mounted in the enclosure to direct the flow of air over the heat generating components.

RAMBUS In-Line Memory Modules, also referred to as RIMM modules, illustrate one example of high performance system components that generate a considerable amount of heat. The RIMM modules are based on the electrical requirements of a technology known as the Direct RAMBUS Channel. This technology includes a high-speed bus operating at clock speeds of 400 MHz or more. Through the use of one or more riser cards, RIMM modules can be configured to provide memory in excess of 8 GigaBytes. A riser card is connected to a memory connector on a motherboard of the computer and a plurality of RIMM modules are connected to the riser card through corresponding RIMM connectors that are mounted on the riser card.

When designing a computer system using RIMM modules, as well as other heat generating system components, it must be taken into consideration that the performance and operating life of these types of system components are adversely affected by excessive temperatures. The magnitude of memory attainable with RIMM modules and the frequency at which RIMM modules operate, can result in the generation of tremendous quantities of heat. As a result, it is necessary to use a cooling apparatus to control the operating temperature of these types of heat generating system components. However, previous apparatuses for cooling system components include shortcomings resulting in the apparatus being costly to manufacture and install, providing limited versatility, adversely affecting acoustical performance and providing limited cooling capacity.

Accordingly, there is a need for an apparatus for mounting and cooling heat generating system components that provides enhanced cooling capability, that can be cost effectively manufactured and installed, that can be used with a variety of system component configurations and that limits induced acoustical noise.

SUMMARY

One embodiment, accordingly, provides an apparatus having a plurality of side panel assemblies that partially define an air duct and having a system component mounted in the air duct such that air can be directed over the system components to provide enhanced convective cooling. To this end, a mounting device for a component of a computer includes a base substrate. A pair of spaced apart end brackets are connected to the base substrate. Each end bracket has an opening formed therein. One of the end brackets is pivotally mounted on the base substrate. A pair of spaced apart side panel assemblies are connected to the end brackets and the base substrate. A shroud is attached to each side panel assembly. Each shroud is movable toward the other shroud to a closed position, and i, movable away from the other shroud to an open position.

A principal advantage of this embodiment is that improved control of airflow is achieved for providing more effective cooling where it is needed without requiring a separate shroud.

BRIEF DESCRIPTION OF THE DRAWING FIGURES

DETAILED DESCRIPTION

Figure 1:
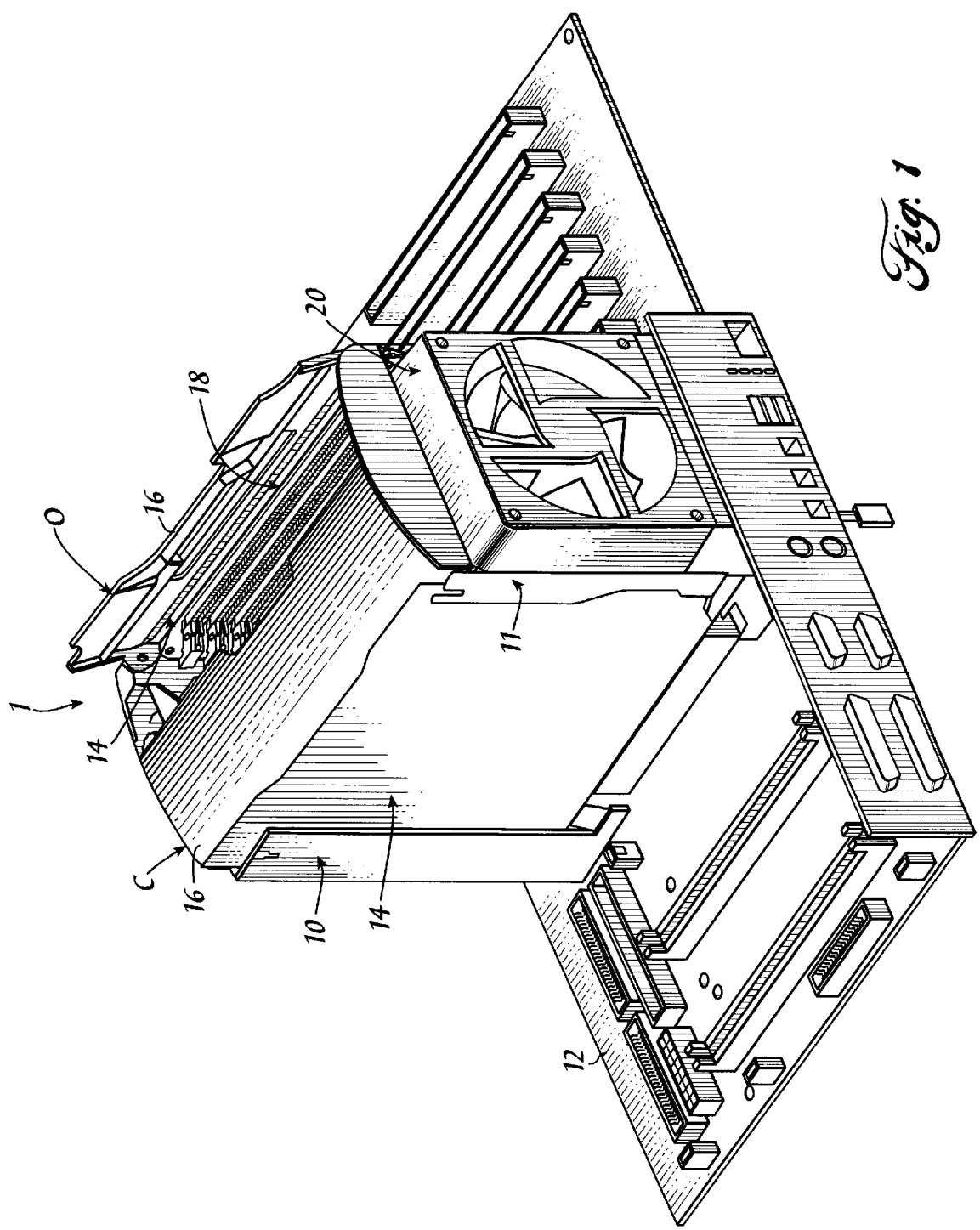
FIG. 1 is a perspective view illustrating an embodiment of an apparatus used for cooling according to the present disclosure.
Figure 2:
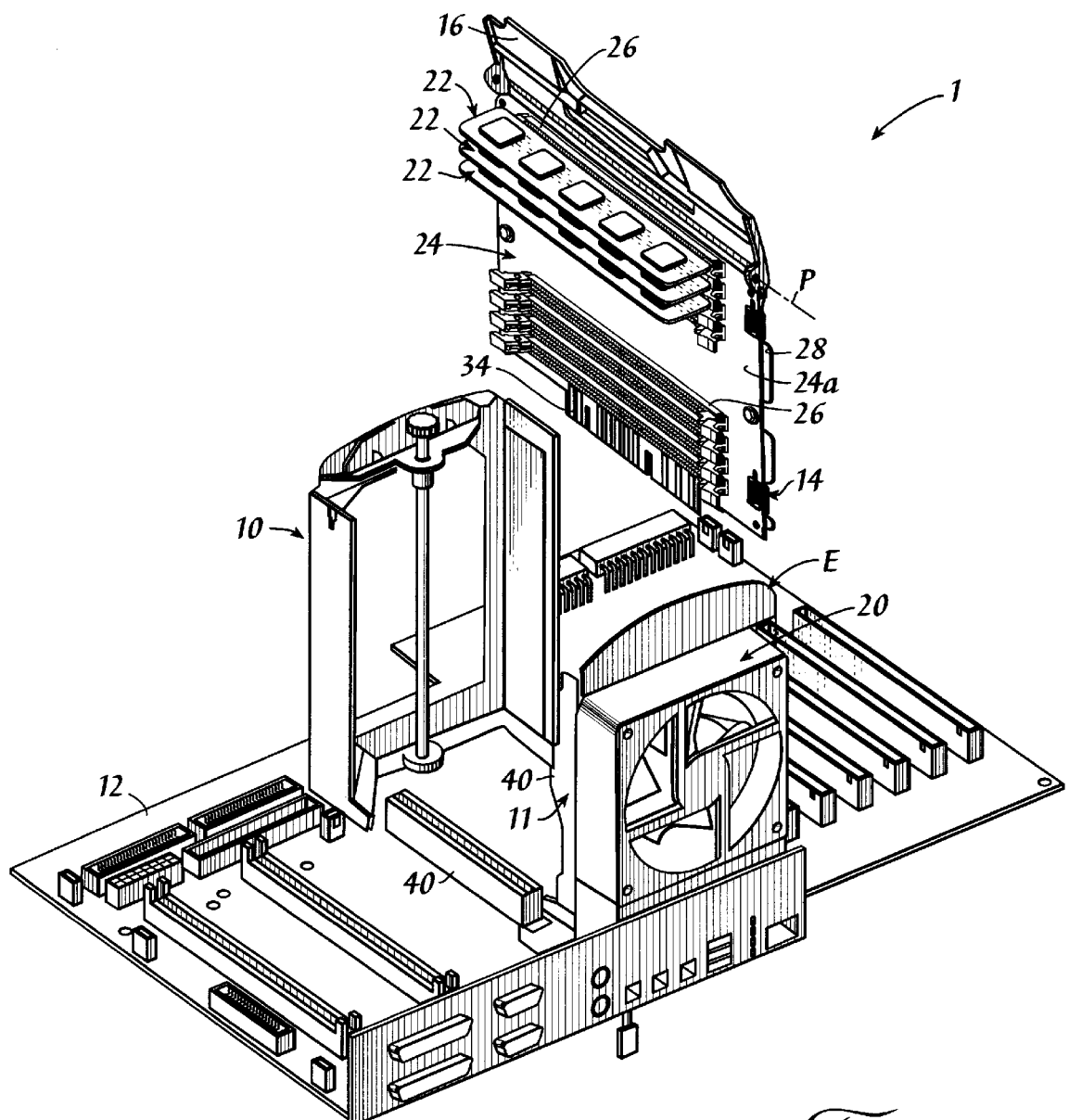
FIG. 2 is a perspective view illustrating the apparatus of FIG. 1 with a plurality of side panel assemblies removed.

An embodiment of an apparatus 1 for cooling a system component of an electronic device and for reducing the magnitude of electromagnetic emissions from the system component is illustrated in FIGS. 1 and 2. The apparatus 1 includes a first end bracket 10 spaced apart from a second end bracket 11. The end brackets 10, 11 are attached to a base substrate 12 such as a motherboard of a computer. Two spaced apart side panel assemblies 14 are removably attached between the end brackets 10, 11.

A shroud member 16 is pivotally attached to each one of the side panel assemblies 14. Each shroud member 16 is movable between an open position O and a closed position C, as illustrated in FIG. 1. When each shroud member 16 is in the closed position C, an air duct 18, FIG. 1, is defined between the base substrate 12, the side panel assemblies 14 and the shrouds 16. The shrouds 16 (when in the closed position C) and the base substrate 12 define opposing side walls of the air duct 18. The end brackets 10, 11 and the shrouds 16 are preferably made of a polymeric material such as Polycarbonate, Acrylonitrile Butadiene Styrene (commonly known as ABS) or a combination thereof using a process such as injection molding.

A plurality of heat generating components 22, FIG. 2, are attached to at least one of the side panel assemblies 14. In one embodiment, the side panel assemblies 14 are system component assemblies including an expansion card or a riser card with at least one heat generating component attached to the expansion card. Heat generating components 22 include system components of an electronic device such as memory modules, microprocessors and video controllers. Each one of the side panel assemblies 14 are oriented between the end brackets 10 and 11 with the heat generating components 22 facing toward the air duct 18. A fan 20 is attached to the second end bracket 11 for directing a stream of air through the air duct 18. In this orientation, the heat generating components 22 are exposed to the stream of air as it passes through the air duct 18 such that the convective transfer of heat from the heat generating components 22 is significantly increased. A key benefit of the shrouds 16 is that each shroud contributes to providing an efficient flow of air through the air duct 18. A key benefit of the fan being attached to the end bracket 11 is reduced acoustical noise associated with the operation of the fan 20. The acoustical noise generated by the fan 20 is reduced by the mechanical attachment of the fan 20 to the end bracket 11 and by the mechanical attachment of the base substrate to an enclosure or chassis of the associated electronic device.

Figure 3:
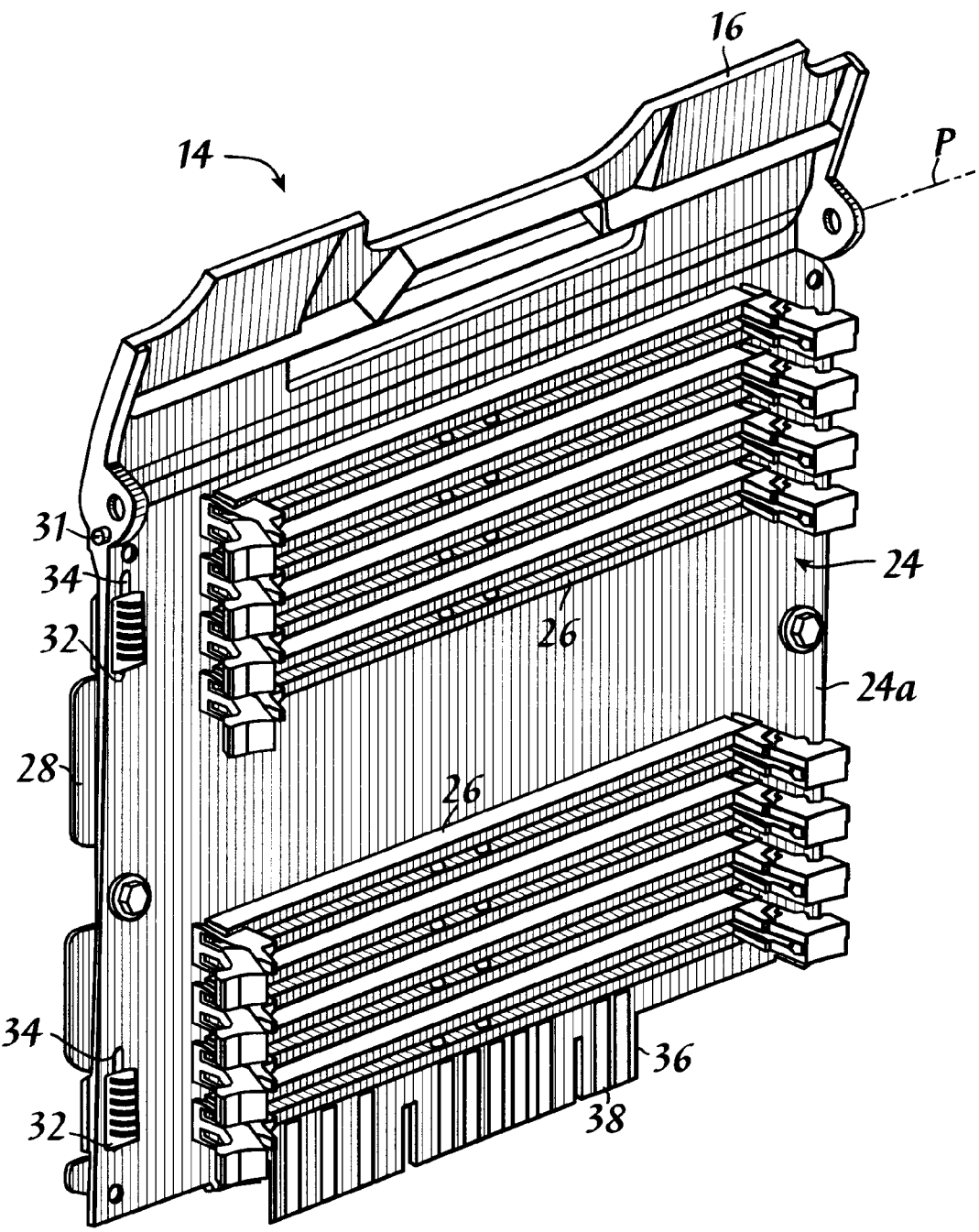
FIG. 3 is a perspective view illustrating an embodiment of a printed circuit substrate portion of the side panel assembly.
Figure 4:
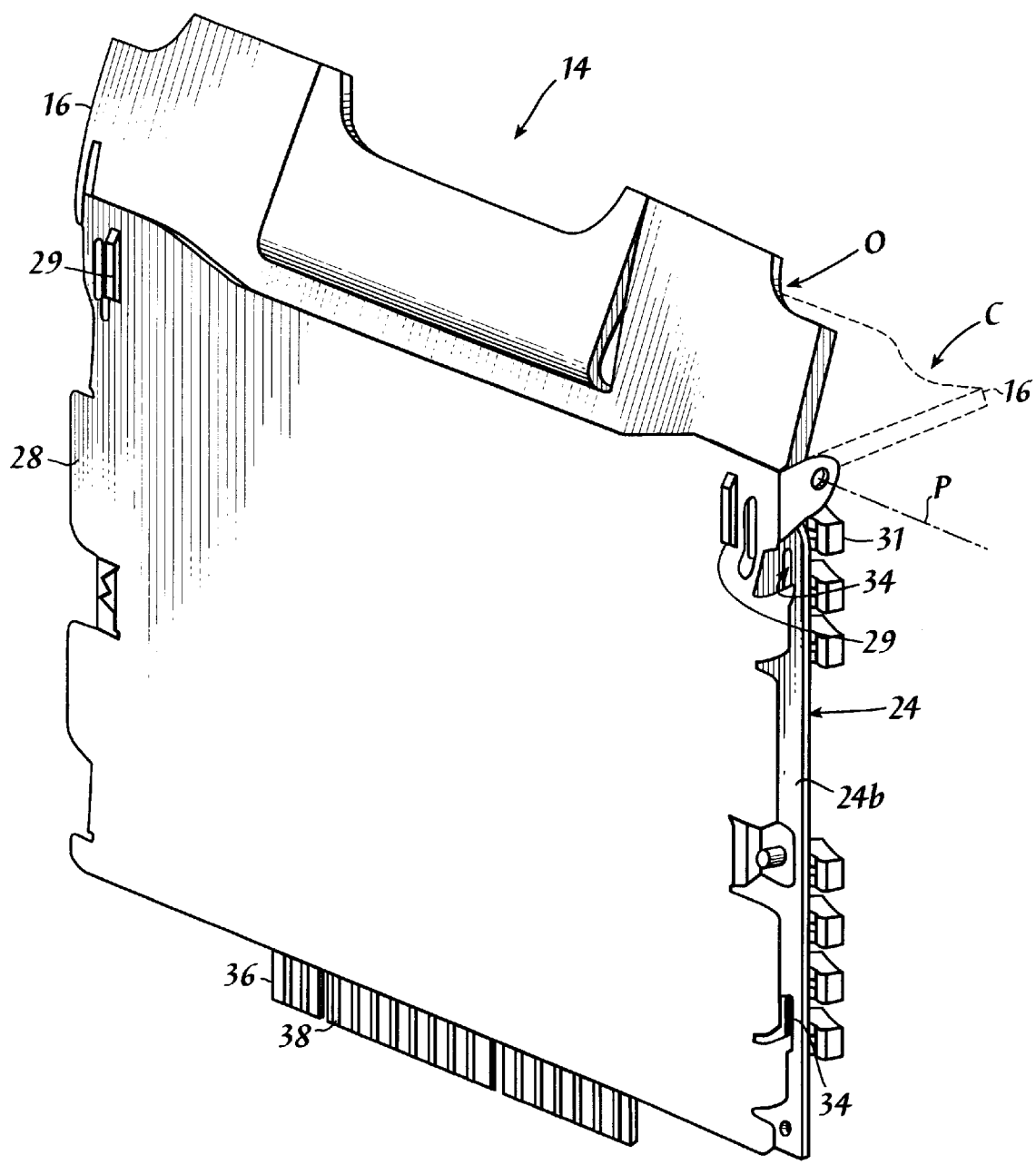
FIG. 4 is a perspective view illustrating an embodiment of a support member portion of the side panel assembly.

Referring now to FIGS. 2–5, the side panel assemblies 14 include a printed circuit substrate 24 having a plurality of connectors 26 attached to the first side 24a, FIGS. 2 and 3, and a support member 28 attached to a second side 24b, FIG. 4. The support member 28 is made of a metallic material such as steel to increase the overall strength of the respective side panel assembly 14. In other embodiments, the support member 28 may be made of a non-conductive material such as a polymeric material. A single size support member 28 can be used with different size printed circuit substrates 24. The support member 28 includes a plurality of alignment members 29. Each one of the end brackets 10, 11 includes an alignment feature, discussed below, that receives a corresponding one of the alignment members 29. The heat generating components 22 are electrically connected to the printed circuit substrate 24 of the corresponding side panel assembly 14.

The shroud 16, FIGS. 3 and 4, is pivotally attached to the support member 28 for being pivoted about a pivot axis P between the open position O and the closed position C, FIG. 4. The shrouds 16 define a shroud assembly extending between the side panel assemblies 14 when both shrouds 16 are in the closed position C. A pivot pin 31 is attached to each end of the shroud 16. Each pivot pin 31 is offset from the pivot axis P such that each pivot pin 31 rotates about the pivot axis P when the shroud 16 is moved between the open position O and closed position C. As discussed below, the pivot pins 31 engage a corresponding portion of the adjacent side panel 10, 11 when the shroud 16 is moved from open position O to the closed position C to positively seat the side panel assembly 14 relative to the base substrate 12.

Figure 5:
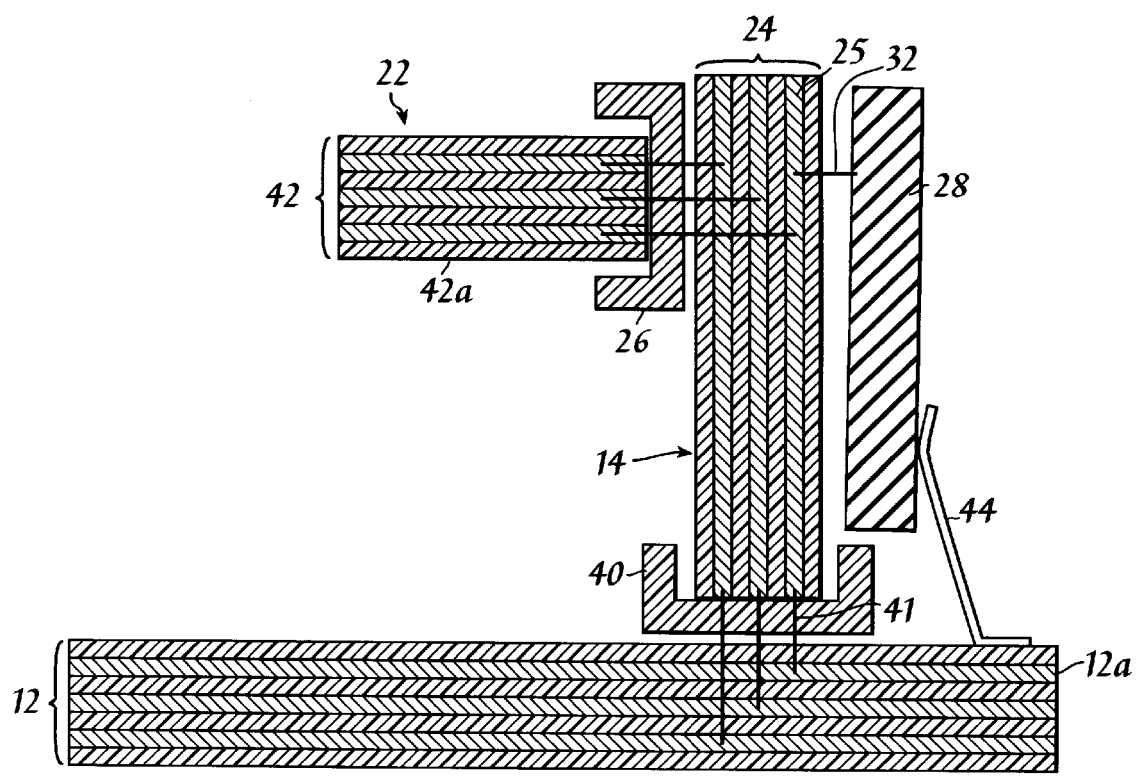
FIG. 5 is a diagrammatic view illustrating an embodiment of the electrical connections between a base substrate, the printed circuit substrate of the side panel assembly and a printed circuit card of a heat generating component.

The printed circuit substrate 24 of the side panel assembly 14 includes at least one reference voltage plane 25, FIG. 5. The support member 28 is electrically connected to the reference voltage plane 25 of the printed circuit substrate 24 by a plurality of clips 32, FIGS. 3 and 5. Each one of the clips 32 are inserted through a corresponding hole 34, FIGS. 3 and 4, in the printed circuit substrate 24. The reference voltage plane 25 is exposed at each hole 34 such that an electrical connection is established between the reference voltage plane 25 and the support member 28.

The printed circuit substrate 24, FIGS. 2–4, also includes an edge portion 36 having a plurality of contacts 38. The contacts 38 are electrically connected to the connectors 26 via conductive traces (not shown) formed on one or more conductive layers of the printed circuit substrate 24. The contacts 38 engage respective terminal (not shown) of a corresponding connector 40, FIG. 2, that is mounted on the base substrate 12. In this manner, electrical continuity is established between the base substrate 12 and heat generating components of the side panel assemblies 14.

As illustrated in FIG. 5, the base substrate 12 includes a reference voltage plane 12a and the heat generating device 22 includes a printed circuit card 42 having a reference voltage plane 42a. A conductive contact member 44 is resiliently mounted to the base substrate 12 adjacent to the connector 26. The conductive contact member 44 is electrically connected to the reference voltage plane 12a of the base substrate 12. When the edge portion 36, FIG. 2, of the side panel assembly 24 is mounted in the connector 40, the conductive contact member 44, FIG. 5, engages the support member 28 to provide electrical continuity between the reference voltage plane 12a of the base substrate 12, the support member 28 and the reference voltage plane 25 of the printed circuit substrate 24. Electrical continuity can also be established between the reference voltage planes 12a and the reference voltage plane 25 through a terminal 41 of the connector 40.

By electrically connecting the support member 28 to the reference voltage planes 12a, 25, 42a of the base substrate 12, the printed circuit substrate 24, and the printed circuit card 42, respectively, a conductive return current path is established for the electrical portion of the electromagnetic emissions. A portion of the electromagnetic emissions couple to the support member 28 and return to their source (the heat generating components). In this manner, the magnitude of the electromagnetic emissions that are emitted from the heat generating components 22 is significantly reduced. It is desirable to reduce the magnitude of the electromagnetic emissions to reduce adverse affects of the electromagnetic emissions (such as electromagnetic interference) on adjacent electronic components and equipment. It is not essential for the reference voltage planes 12a, 25 to be ground planes. They need only be constant voltage planes.

Figure 6A:
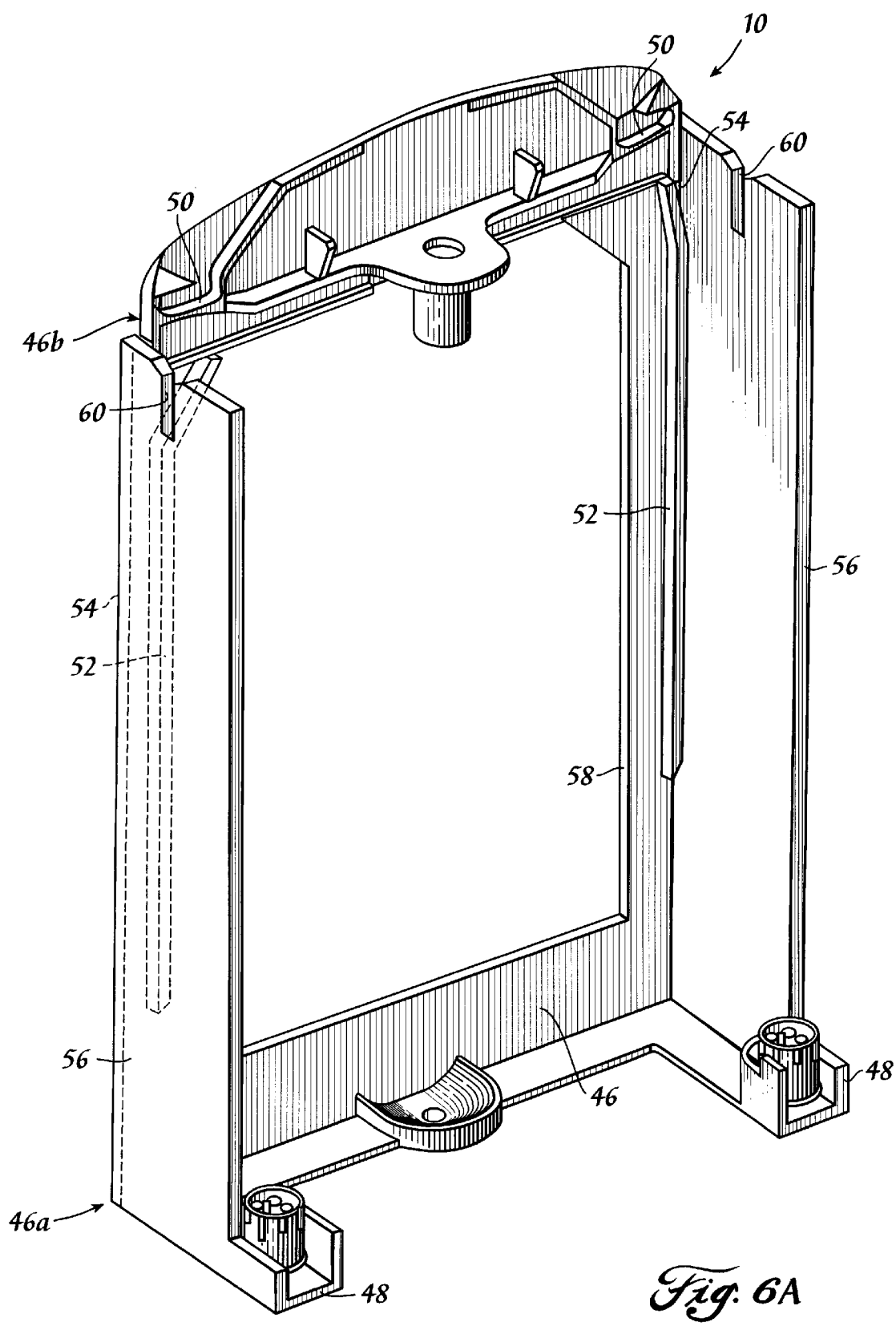
FIG. 6A is a perspective view illustrating an embodiment of an end bracket.
Figure 6B:
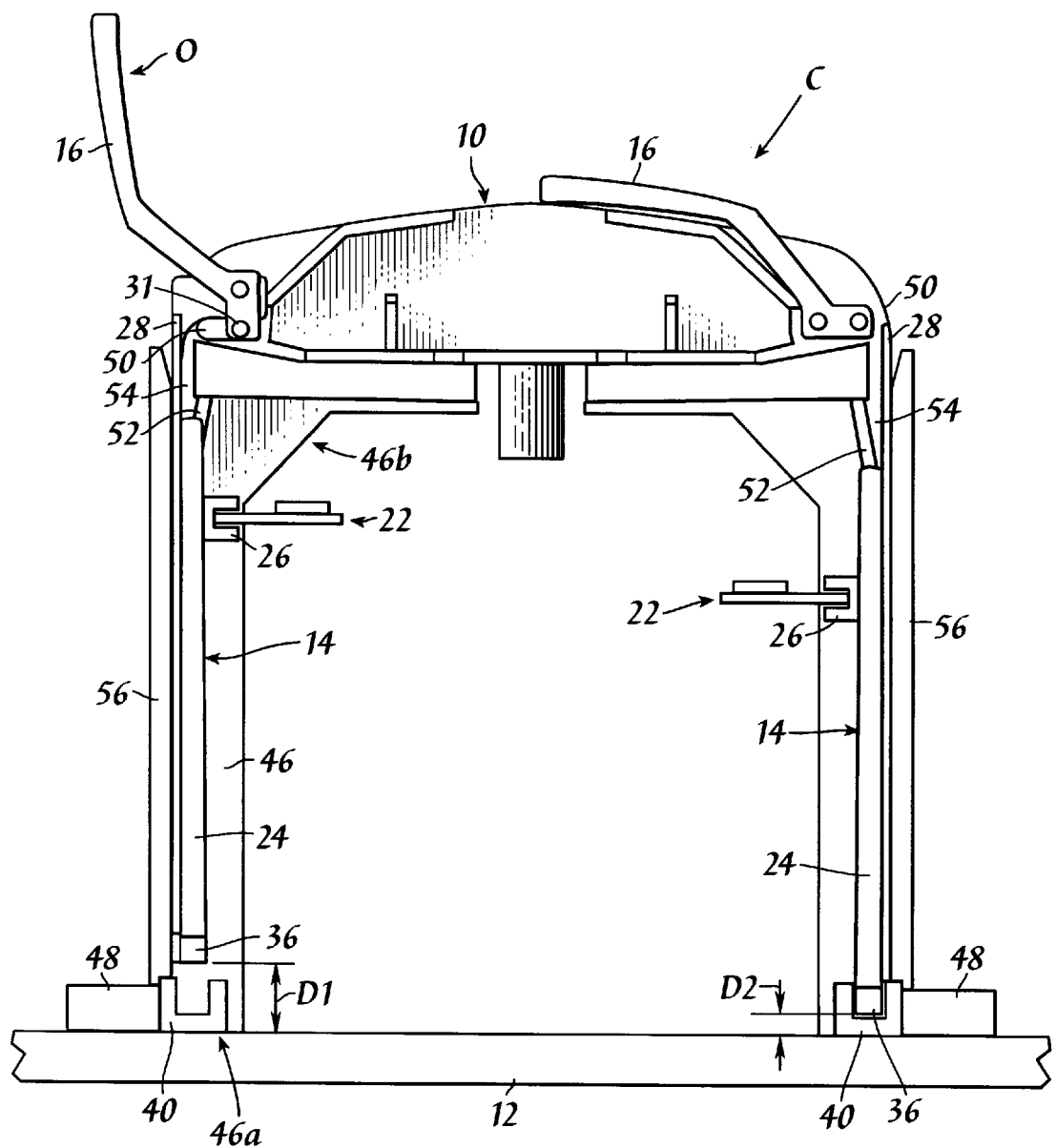
FIG. 6B is a diagrammatic view illustrating a side panel assembly at an inserted depth and side panel assembly at a seated depth with respect to the base substrate.

An embodiment of the first end bracket 10 is illustrated in FIGS. 6A and 6B. The first end bracket 10 includes an end wall 46 and a plurality of mounting members 48 attached adjacent to a first end 46a of the end wall 46. The mounting members 48 are configured for being attached to a base structure such as the base substrate 12 illustrated in FIG. 1. A plurality of shroud engaging portions 50 are attached adjacent to a second end 46b of the end wall 46. A plurality of guide members 52 are attached to the end wall 46. The guide members 52 extend between the first and second ends 46a, 46b of the end wall 46. The first end bracket 10 is defined to be a stationary end bracket in that it is not pivotable with respect to the base substrate 12.

A slot 54, FIG. 6A, for receiving a corresponding one of the side panel assemblies 14 is defined between each guide member 52 and a corresponding side wall 56. A opening 58 is formed through the end wall 46 between two of the guide members 52. A slot 60, is provided in each side wall 56 for receiving the alignment member 29, FIG. 4, of the corresponding side panel assembly 14.

As illustrated in FIG. 6B, when the shroud 16 is in the open position O, the side panel assembly 14 may be inserted to an insertion position D1 with respect to the base substrate 12. When shroud 16 is moved to the closed position C, the pin 31 of each shroud 16 engages the corresponding shroud engaging portion 50 of the first end bracket 10, moving the side panel assembly 14 to a seated position D2 with respect to the base substrate 12 such that the edge portion 36 of the printed circuit substrate 24 engages the corresponding connector 40 of the base substrate 12.

Figure 7:
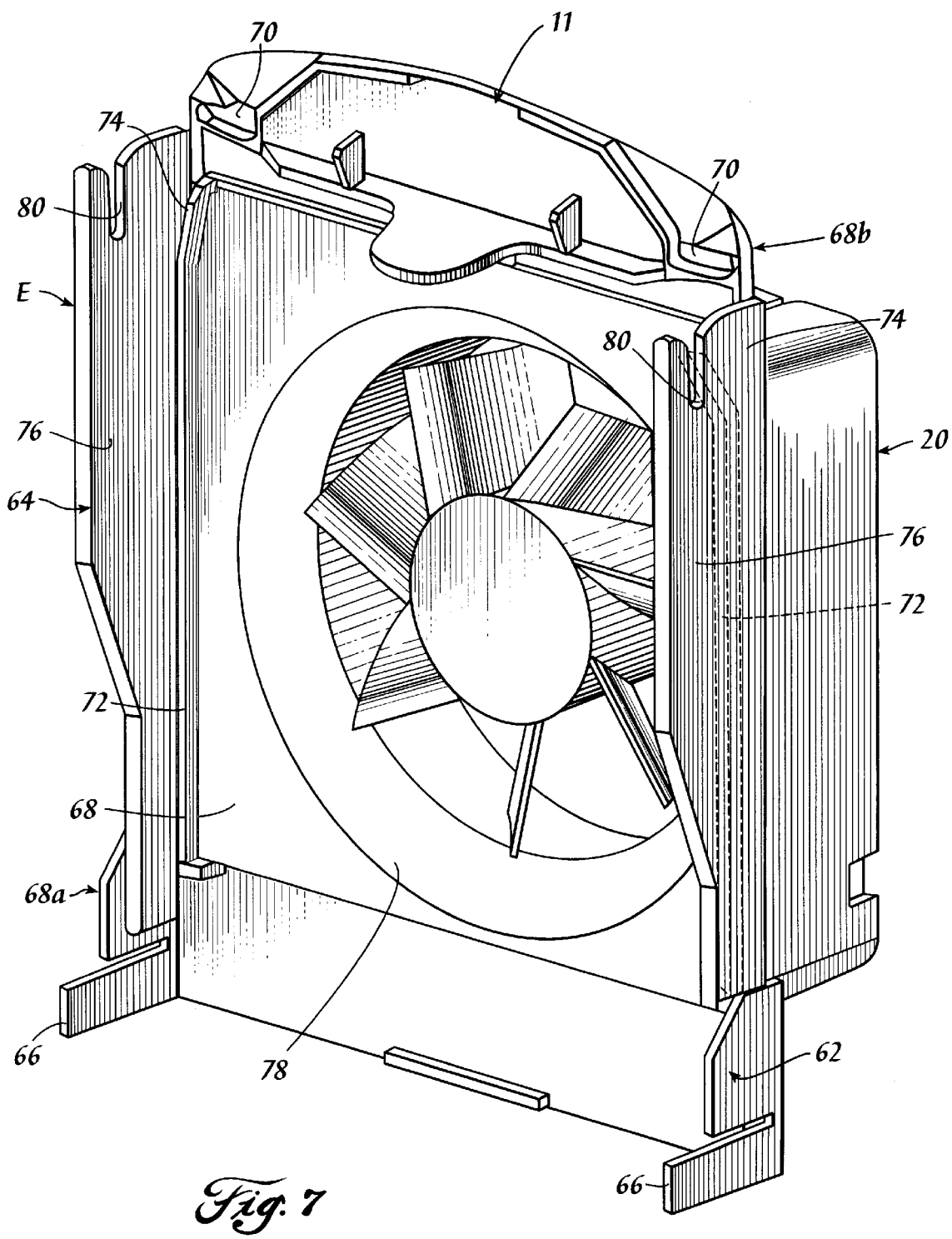
FIG. 7 is a perspective view illustrating another embodiment of an end bracket.
Figure 8:
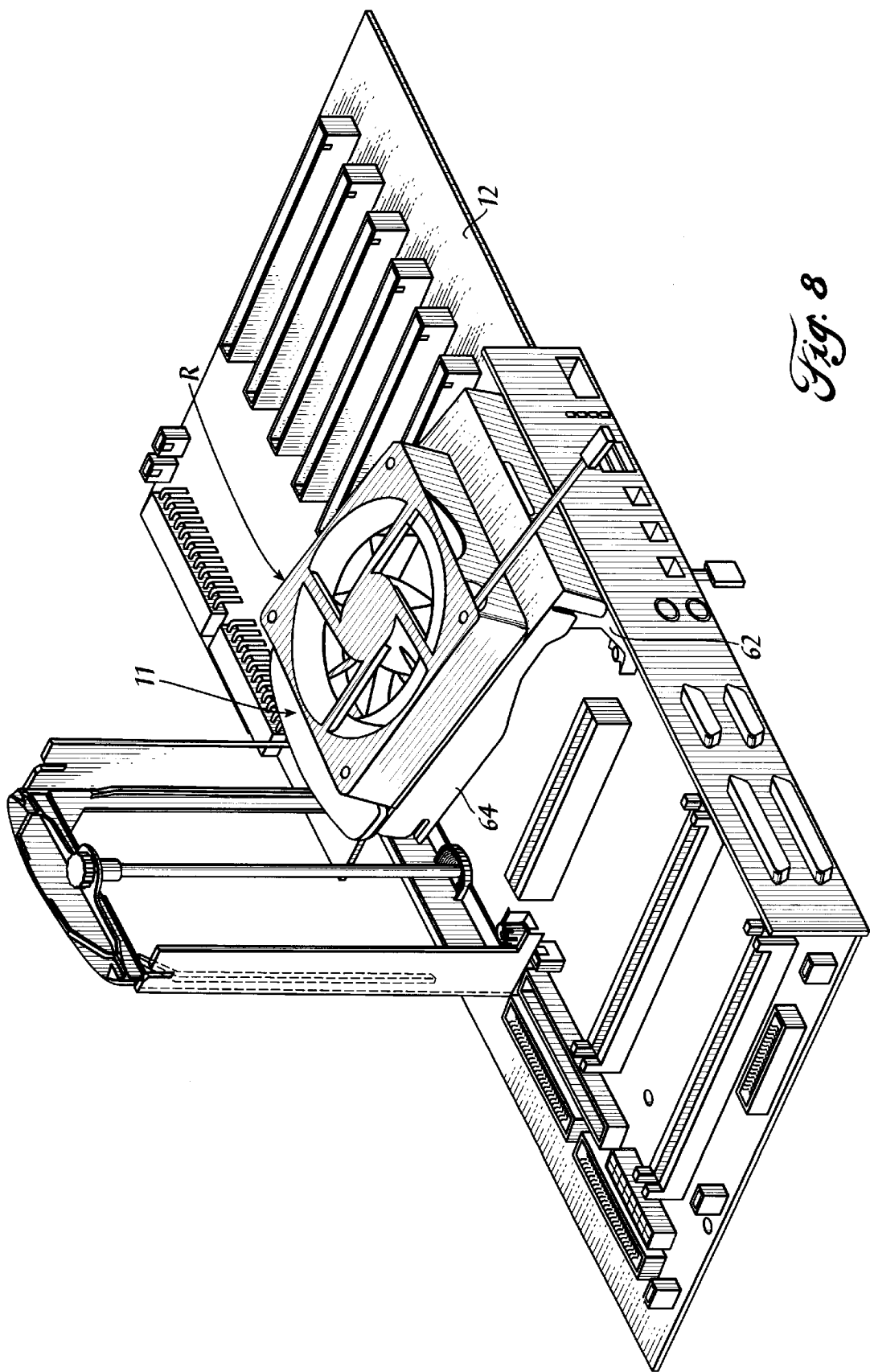
FIG. 8 is a perspective view illustrating the end bracket of FIG. 7 in a retracted position.

An embodiment of the second end bracket 11 is illustrated in FIGS. 7 and 8. The second end bracket 11 includes a base portion 62 and a mounting portion 64. The base portion 62 of the second end bracket 11 includes a plurality of mounting members 66 configured for being attached to a base structure such as the base substrate 12 illustrated in FIG. 8. The mounting portion 64 of the second end bracket 11 is pivotally attached at a first end 68a of an end wall 68 to the base portion 62 for being moved between an extended position E, FIGS. 2 and 7, and a retracted position R, FIG. 8, with respect to the base portion 62. It is desirable for the mounting portion 62 to be movable to the retracted position R to simplify installation of the base substrate 12 into a housing of an electronic apparatus (such as a computer) with second end bracket 11 already attached to the base substrate 12. Furthermore, servicing of components adjacent to the second end bracket 11 is simplified by removing the side panel assemblies 14 and moving the second end bracket 11 to the retracted position R. The second end bracket 11 is defined to be a pivotable end bracket in that it is pivotable with respect to the base substrate 12. Several benefits are associated with the second end bracket 11 being pivotable.

A plurality of shroud engaging portions 70, FIG. 7, are attached adjacent to a second end 68b of the end wall 68. A plurality of guide members 72 are attached to the end wall 68. The guide members 72 extend between the first and second ends 68a, 68b of the end wall 68. A slot 74 for receiving a corresponding one of the side panel assemblies 14 is defined between each guide member 72 and a corresponding side wall 76. A opening 78 is formed through the end wall 68 between two of the guide members 72. The fan 20, discussed above in reference to FIGS. 1 and 2, is attached to the mounting portion 64 adjacent to the opening 78 for directing a stream of air through that opening. A slot 80 is provided in each side wall 76 for receiving the alignment member 29, FIG. 4, of the corresponding side panel assembly 14.

Figure 9:
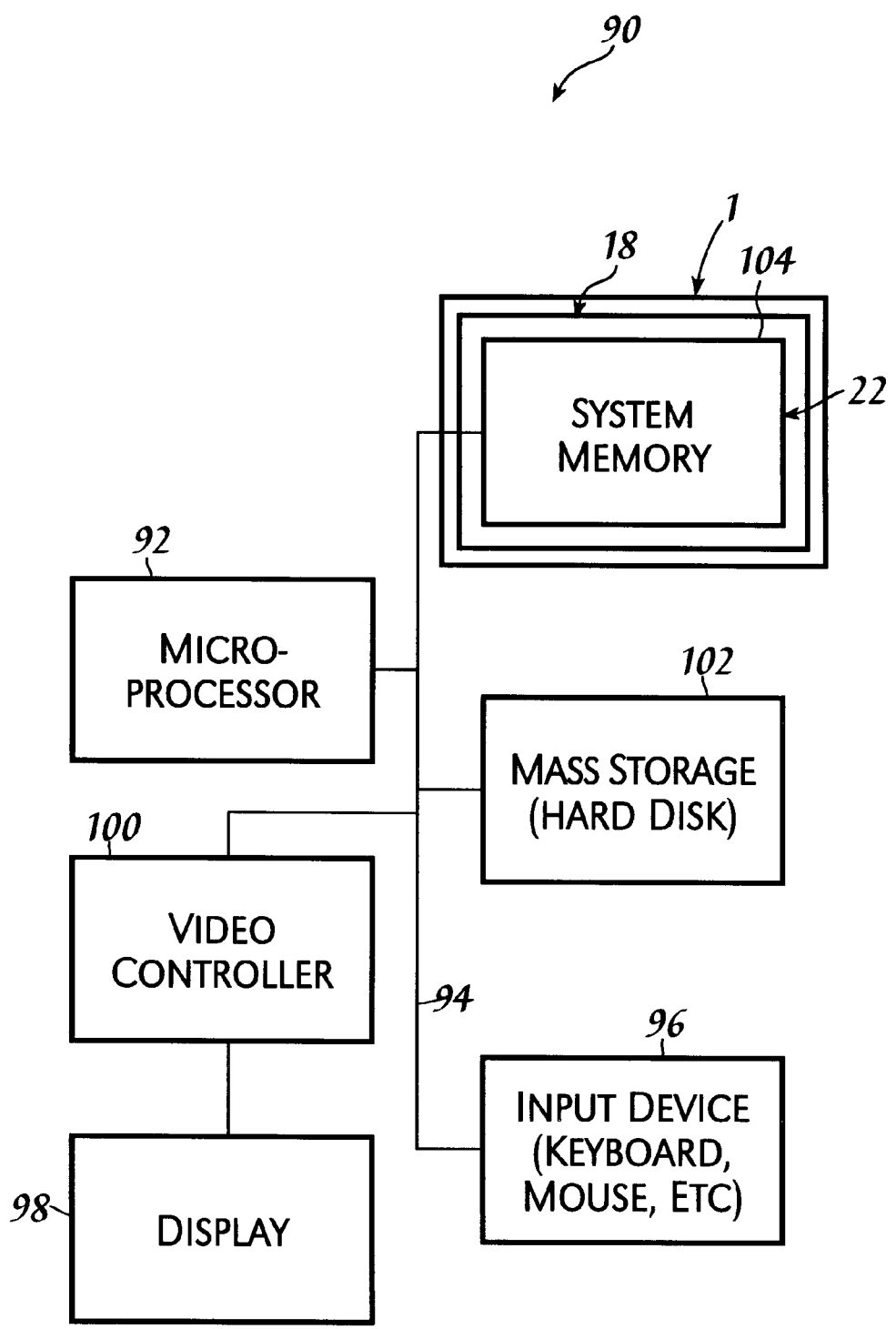
FIG. 9 is a block diagram illustrating an embodiment of a computer system.

An embodiment of a computer system 90 is illustrated in FIG. 9. The computer system 90 includes at least one microprocessor 92. The microprocessor 92 is connected to a signal bus 94. The signal bus 94 serves as a connection between the microprocessor 92 and other components of the computer system 90. One or more input devices 96 may be coupled to the microprocessor 92 to provide input to the microprocessor 92. Examples of input devices include keyboards, touchscreens, and pointing devices such as a mouse, a trackball and a trackpad. The computer system 90 may also include a display 98 which is typically coupled to the microprocessor 92 by a video controller 100. Programs and data are stored on a mass storage device 102 which is coupled to the microprocessor 92. Mass storage devices include components such as hard disks, optical disks, magneto-optical drives, floppy drives, and the like. A system memory 104 is coupled to the microprocessor 92 for providing the microprocessor 92 with fast storage to facilitate execution of computer programs by the microprocessor 92. The system memory 104, which includes the heat generating component 22 of the computer system 90, is mounted within the air duct 18 of the apparatus 1 discussed above in reference to FIG. 1. It should be understood that other busses and intermediate circuits can be employed between the components described above and microprocessor 92 to facilitate interconnection between the components and the microprocessor 92.

One embodiment provides an apparatus for mounting system components in an electronic device including a base substrate and a plurality of spaced apart end brackets attached to the base substrate. A pivotable one of the end brackets is movable between a retracted position and an extended position. A plurality of spaced apart side panel assemblies are removably mounted between a mounting portion of each end bracket when the pivotable one of the end brackets is in the extended position. A first edge of each side panel assembly is positioned adjacent to the base substrate. A shroud assembly extends between the two side panel assemblies adjacent to a second edge of each side panel assembly. The shroud assembly, the base substrate and the side panel assemblies define an air duct. A fan is mounted adjacent to at least one of the end brackets for directing air through the air duct.

Another embodiment provides a computer system including a base substrate and a microprocessor mounted on the base substrate. An input is coupled to the microprocessor to provide input to the microprocessor and a display is coupled to the microprocessor by a video controller. A mass storage device is coupled to the microprocessor. A plurality of spaced apart end brackets are attached to the base substrate. A pivotable one of the end brackets is movable between a retracted position and an extended position. A plurality of spaced apart side panel assemblies are removably mounted between a mounting portion of each end bracket when the pivotable one of the end brackets is in the extended position. A first edge of each side panel assembly is positioned adjacent to the base substrate. A shroud assembly extends between the side panel assemblies adjacent to a second edge of each side panel assembly. The shroud assembly, the base substrate and the side panel assemblies define an air duct. A memory module is removably attached in the air duct to each printed circuit substrate. Each memory module is coupled to the microprocessor to provide storage to facilitate execution of computer programs by the microprocessor. A fan is mounted adjacent to at least one of the end brackets for directing air through the air duct.

A further embodiment provides a mounting device including a motherboard including spaced apart connectors mounted on the motherboard. A first riser card is attached at a first edge thereof to a first one of the connectors and a second riser card is attached at a first edge thereof to a second one of the connectors. The riser cards extend generally perpendicular to the motherboard. A first end bracket is attached to the motherboard. A first end of each one of the riser cards is supported by the first end bracket. A second end bracket is pivotably mounted to the motherboard for being moved between a retracted position and an extended position. A second end of each one of the riser cards is supported by the second end bracket when the second end bracket is in the extended position. A shroud assembly extends between the riser cards adjacent to a second edge of each riser card. The shroud assembly, the motherboard and the riser cards define an air duct. A system component is mounted on each riser card within the air duct. A fan is attached to at least one of the end brackets for directing air through the air duct.

In another embodiment, a mounting device for a component of a computer includes a base substrate. A pair of spaced apart end brackets are connected to the base substrate. Each end bracket has an opening formed therein. One of the end brackets is pivotably mounted on the base substrate. A pair of spaced apart side panel assemblies are connected to the end brackets and the base substrate. A shroud is attached to each side panel assembly. Each shroud is movable toward the other shroud to a closed position, and is movable away from the other shroud to an open position.

As it can be seen, the embodiments presented herein provide several advantages. The part count is reduced with respect to previous cooling devices such that cost and assembly time are also reduced. At least one of the end brackets can be pivoted to the retracted position to allow the printed circuit substrate and end brackets to be more easily installed in the chassis as an assembly and to permit cost effective servicing of the apparatus. An apparatus according to the present disclosure can be readily installed and removed without the use of tools such that assembly time and serviceability are enhanced. Improved control of airflow is achieved for providing more effective cooling where it is needed without requiring a separate shroud. Acoustic noise is significantly reduced without added cost due to the fan vibrations being isolated from components of the system, such as the chassis, that are know to readily transmit acoustical noise.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An apparatus for mounting system components in an electronic device, comprising:
    a base substrate;
    a plurality of spaced apart end brackets attached to the base substrate, a pivotable one of the end brackets, being movable between a retracted position and an extended position;
    a plurality of spaced apart side panel assemblies removably mounted between a mounting portion of each end bracket when the pivotable one of the end brackets is in the extended position, a first edge of each side panel assembly positioned adjacent to the base substrate;
    a shroud assembly extending between at least two of the side panel assemblies adjacent to a second edge of each respective side panel assembly, the shroud assembly, the base substrate and the side panel assemblies defining an air duct; and
    a fan mounted adjacent to at least one of the end brackets for directing air through the air duct.

2. The apparatus of claim 1 wherein the pivotable one of the end brackets includes a base portion pivotally attached to the mounting portion, the mounting portion being movable between a retracted position and an extended position.

3. The apparatus of claim 1 wherein each one of the side panel assemblies includes a printed circuit substrate.

4. The apparatus of claim 3 further comprising a system component mounted on a first side of each printed circuit substrate, the first side of at least two of the printed circuit substrates defining an interior surface of the air duct.

5. The apparatus of claim 3 further comprising a plurality of memory modules mounted on a first side of each printed circuit substrate, the first side of at least two of the printed circuit substrate defining an interior surface of the air duct.

6. The apparatus of claim 5 further comprising a support member attached to a second side of each printed circuit substrate.

7. The apparatus of claim 6 wherein each support member is made of an electrically conductive material and wherein the support member of each side panel assembly is electrically connected to the system component of the respective printed circuit substrate.

8. The apparatus of claim 1 further comprising an alignment member attached to each support member and further comprising a slot in each end bracket engaged with the corresponding alignment member.

9. The apparatus of claim 4 wherein each printed circuit substrate includes an edge portion and a plurality of contacts mounted on the edge portion, the contacts being electrically connected to the system component of the respective printed circuit substrate and further comprising an electrical connector attached to the base substrate adjacent to each edge portion, the edge portion engaged with the corresponding connector.

10. The apparatus of claim 1 further comprising a plurality of guide members attached to each end bracket, each side panel assembly being supported by at least one guide member of each end bracket.

11. The apparatus of claim 1 wherein the shroud assembly includes a shroud pivotally attached to each one of the side panel assemblies for being moved between an open position and a closed position.

12. A computer system, comprising:
    a base substrate;
    a microprocessor mounted on the base substrate;
    an input coupled to the microprocessor to provide input to the microprocessor;
    a display coupled to the microprocessor by a video controller;
    a mass storage coupled to the microprocessor;
    a plurality of spaced apart end brackets attached to the base substrate, a pivotable one of the end brackets being movable between a retracted position and an extended position;
    a plurality of spaced apart side panel assemblies removably mounted between a mounting portion of each end bracket when the pivotable one of the end brackets is in the extended position, a first edge of each side panel assembly positioned adjacent to the base substrate;
    a shroud assembly extending between at least two of the side panel assemblies adjacent to a second edge of each side panel assembly, the shroud assembly, the base substrate and the side panel assemblies defining an air duct;

a memory module removably attached in the air duct to each printed circuit substrate, each memory module being coupled to the microprocessor to provide storage to facilitate execution of computer programs by the microprocessor; and a fan mounted adjacent to at least one of the end brackets for directing air through the air duct.

13. The computer system of claim 12 wherein the pivotable one of the end brackets includes a base portion pivotally attached to the mounting portion, the mounting portion being movable between a retracted position and an extended position.

14. The computer system of claim 12 wherein each one of the side panel assemblies includes a printed circuit substrate.

15. The computer system of claim 14 further comprising a support member attached to a second side of each printed circuit substrate.

16. The computer system of claim 15 wherein the support member is made of an electrically conductive material and wherein the support member of each printed circuit substrate is electrically connected to the system component of the respective printed circuit substrate.

17. The computer system of claim 12 further comprising an alignment member attached to each support member and further comprising a slot in each end bracket engaged with the corresponding alignment member.

18. The computer system of claim 12 wherein each printed circuit substrate includes an edge portion and a plurality of contacts mounted on the edge portion, the contacts being electrically connected to the memory module of the respective printed circuit substrate and further comprising a plurality of electrical connectors attached to the base substrate, the edge portion of each printed circuit substrate engaged with a corresponding one of the connectors.

19. The computer system of claim 12 further comprising a plurality of guide members attached to each end bracket, each side panel assembly being supported by at least one guide member of each end bracket.

20. The computer system of claim 12 wherein the shroud assembly includes a shroud pivotally attached to each one of the side panel assemblies for being moved between an open position and a closed position.

21. A mounting device for a system component of a computer, comprising:

a motherboard including spaced apart connectors mounted thereon;

a first riser card attached at a first edge thereof to a first one of the connectors and a second riser card attached at a first edge thereof to a second one of the connectors, the riser cards extending generally perpendicular to the motherboard;

a first end bracket attached to the motherboard, a first end of each one of the riser cards being supported by the first end bracket;

a second end bracket pivotally connected to the motherboard for being moved between a retracted position and an extended position, a second end of each one of the riser cards being supported by the second end bracket when the second end bracket is in the extended position;

a shroud assembly extending between the riser cards adjacent to a second edge of each riser card, the shroud assembly, the motherboard and the riser cards defining an air duct;

a system component mounted on each riser card within the air duct; and a fan attached to at least one of the end brackets for directing air through the air duct.

22. A mounting device for a component of a computer comprising:

a base substrate;

a pair of spaced apart end brackets connected to the base substrate, each end bracket having an opening formed therein, one of the end brackets being pivotably mounted on the base substrate;

a pair of spaced apart side panel assemblies connected to the end brackets and the base substrate; and a shroud attached to each side panel assembly, each shroud being movable toward each other shroud to a closed position, and movable away from each other shroud to an open position.

* * * * *